United States Patent

[11] 3,612,865

| [72] | Inventor | William G. Walker<br>Rockaway, N.J. |
|---|---|---|
| [21] | Appl. No. | 774,320 |
| [22] | Filed | Nov. 8, 1968 |
| [45] | Patented | Oct. 12, 1971 |
| [73] | Assignee | Nuclear-Chicago Corporation<br>Des Plaines, Ill. |

[54] TOMOGRAPHIC RADIATION CAMERA
14 Claims, 6 Drawing Figs.

[52] U.S. Cl. .................................................. 250/71.5,
250/105, 250/108
[51] Int. Cl. ..................................................... G01t 1/20
[50] Field of Search .......................................... 250/71.5 S,
65, 105, 108

[56] References Cited
UNITED STATES PATENTS
3,291,988  12/1966  Chope et al. .................. 250/108 X
3,432,660  3/1969   Anger ........................... 250/71.5 S

*Primary Examiner*—Archie R. Borchelt
*Attorneys*—Lowell C. Bergstedt, Walter C. Ramm and Helmuth A. Wegner ABSTRACT: An Anger-type stationary radiation detector having an angular, multichannel collimator rotatably mounted thereon. Output circuitry associated with the rotation of the collimator translates the detector output coordinate signals into selected tomographic images of the distribution of radionuclides throughout a stationary object under investigation.

PATENTED OCT 12 1971 3,612,865

INVENTOR
William G. Walker
BY Lowell C. Bergstedt
ATTORNEY

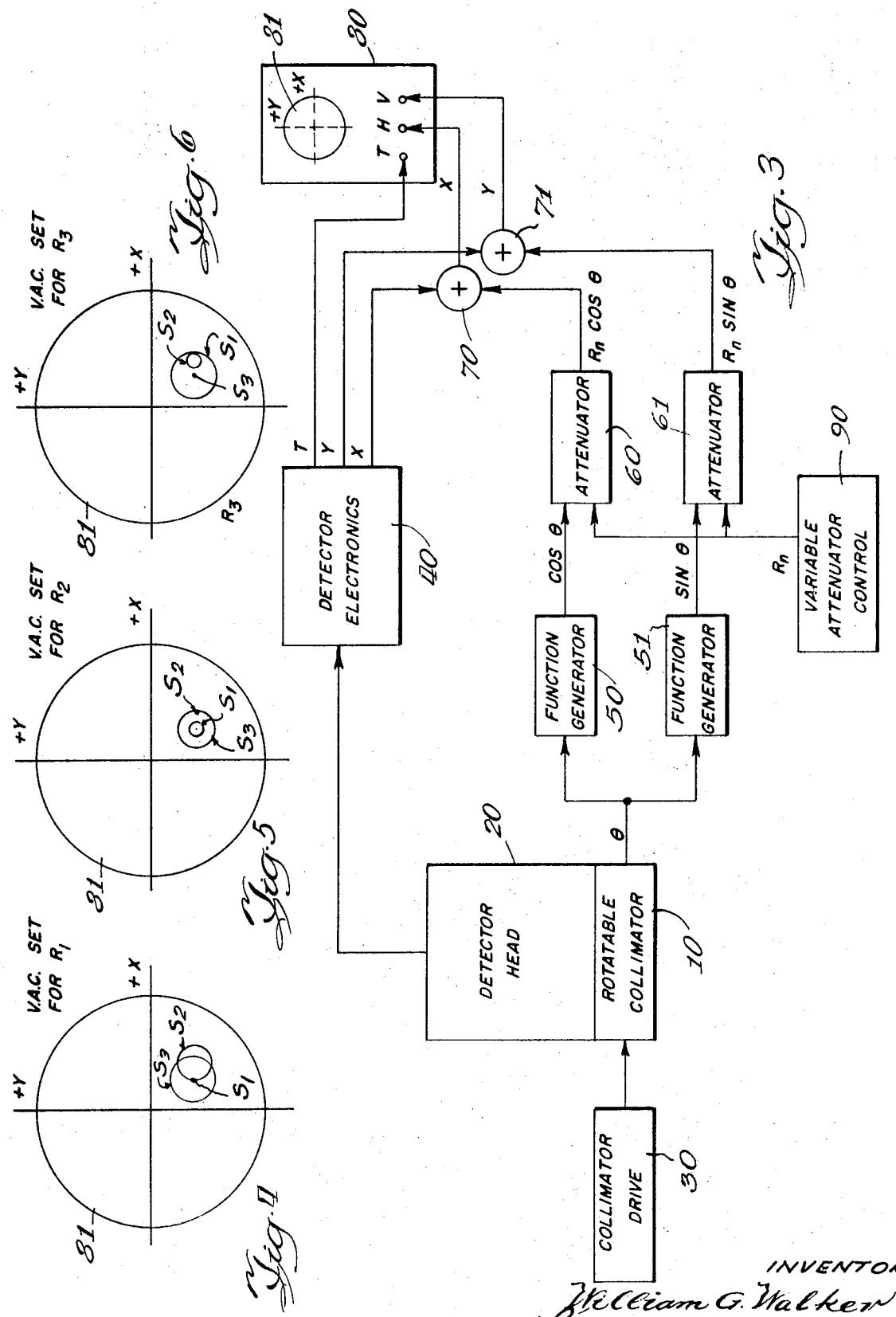

TOMOGRAPHIC RADIATION CAMERA

Various types of stationary in vivo radiation imaging devices are in use in laboratories and hospitals throughout the world. Among these devices are the well-known scintillation camera invented by Hal O. Anger and described in U.S. Pat. No. 3,011,057, image intensifier-type devices, spark chambers, etc. These stationary imaging devices are in contrast with various scanning devices also used for imaging the distribution of radioactivity in vivo. Stationary or camera devices have the feature of viewing all of the object under study at all times, whereas scanning devices view only part of the object at any one time and form an image of the whole object by scanning in a raster.

Radiation cameras respond to radiation coming from all parts of the object under investigation. When the object is a particular organ in the body in which radionuclides have lodged, a volume distribution of radionuclides is imaged by the camera as a projection on a single plane, In other words, the volume distribution of the radionuclides is not imaged in three dimensions although this is often compensated for by taking several views of the same organ from different angles.

In a University of California Lawrence Radiation Laboratory publication, UCRL—16899, dated May 31, 1966, Hal Anger describes a Tomographic Gamma Ray Scanner with Simultaneous Readout of Several Planes. In essence, the Anger tomographic scanner involves taking an imaging device with two dimensional, stationary imaging capabilities, attaching a focused collimator thereto, scanning the imaging device and collimator over the object under investigation, and optically correcting the information displayed on the cathode-ray tube at the output of the imaging device to produce a plurality of images which depict "in focus" the activity on various planes at various depths within the object. The device thus accomplishes tomography at the expense of moving the detector head in a time-consuming scanning motion over the object under investigation.

Other types of tomographic scanning arrangements have been described by various individuals. All of them, however, involve motion of the detecting portion of the imaging system with respect to the subject or vice versa. There are well-known disadvantages involved in all scanning-type systems. A particular disadvantage is their inability to image dynamic activity within the object being investigated. The desirability of providing a stationary imaging device having tomographic imaging capabilities is thus readily apparent.

Therefore, the principal object of this invention is to provide improved radiation imaging apparatus.

Another object of this invention is to provide an improved radiation camera for imaging the volume distribution of radionuclides throughout an object under investigation.

More particularly, it is an object of this invention to provide a radiation camera having tomographic imaging capabilities, during operation of which the radiation detector and an object under investigation remain stationary.

A preferred embodiment of this invention includes a radiation detector of the Anger scintillation camera type adapted to be held stationary over an object under investigation and means interposed between the radiation detector and the object for producing predetermined patterned movement in the detector of images generated by quanta of radiation emanating from radionuclides in each elemental volume of the object. In its preferred form, in means interposed between the detector and the object is a rotatable multichannel collimator having the parallel axes of the individual collimator channels at a selected nonnormal angle to the crystal in the detector. Such a collimator, when rotated, produces a generally circular movement of images on the radiation detector with the radius of the movement dependent upon the depth of a particular elemental volume of radionuclides within the object. The circular movement of images in the detector may be translated selectively into displayed in-focus images of the distribution of radionuclides across a plane at a particular selected depth in the object. In other words, by performing preselected operations on the position coordinate signals at the output of the radiation detector, a displayed image can be produced which depicts the images from radionuclides on a plane at a particular depth as being in-focus while the images from other radionuclides on other planes are relatively out-of-focus or blurred.

It should be understood that this invention is not limited to radiation detectors of the Anger scintillation camera type, but can employ any radiation detector capable of providing position coordinate output signals.

By providing this tomographic capability in essentially stationary apparatus with only the collimator rotating, an imaging system is provided which is essentially equivalent to a radiation camera but has the added facility of producing depth-related display of the distribution of radioactivity throughout the total volume of the object. The total object stays essentially within the field of view of the radiation detector at all times so that rapid investigations of stationary or dynamic radioactivity distributions throughout the subject can be performed. Clearly the added capability of tomographic imaging is a distinct advantage and is likely to preclude the taking of multiple views of the object which might otherwise be required to refine the image data produced by the radiation detector.

Other objects, features, and advantages of this invention will be apparent from a consideration of the following detailed description in conjunction with the accompanying drawings in which:

FIG. 3 is a block schematic diagram of a preferred form of this invention.

FIGS. 4 through 6 are pictorial representations of various tomographic output images useful in explaining the operation of the invention.

Figure 1:
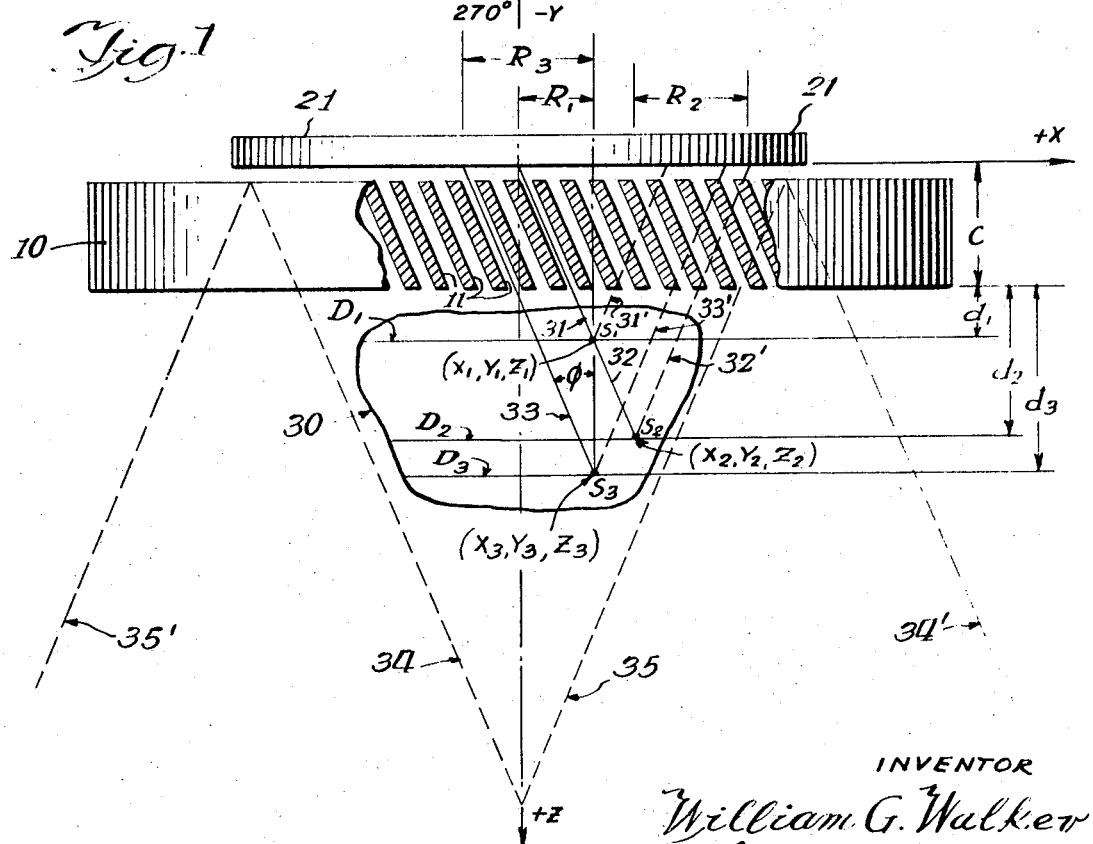
FIG. 1 is an essentially schematic view of a portion of a preferred embodiment of this invention.

Referring now to FIGS. 1 ad 2, a collimator 10 is shown interposed between a radiation sensitive transducer 21 and an object 30 under investigation. Collimator 10 comprises essentially a cylindrical slab of radiation opaque material defining a plurality of collimating channels 11. Collimating channels 11 have a common axial orientation at an angle $\Phi$ to a line normal to the surface of transducer 21. The shape of the individual collimator channels 11 are shown as cylindrical in FIG. 1, but, as is well known, they may be conical and may have other configuration as well. The important aspect is that their axial orientation is common and nonnormal to the surface to transducer 21.

In the preferred embodiment of this invention involving an Anger-type scintillation camera head, transducer 21 becomes a thin, cylindrical crystal of thallium-activated sodium iodide. The other elements in a scintillation camera head, such as windows, light pipes, photomultipliers, etc., are not shown since they are described adequately in the above-referenced Anger patent and in the many other publications on Anger-type scintillation cameras.

In addition, the means of supporting collimator 10 in the illustrated physical relationship between transducer 21 and body 30 is not shown since it is considered obvious to those skilled in the art how such a collimator could be supported in a rotatable fashion beneath the basic detector head of an Anger-type scintillation camera.

For purposes of illustration, collimator 10 is shown in a particular orientation that will be designated as the reference orientation with a 0° designation in a polar coordinate system. In addition, a rectangular coordinate system with its origin at the central axis of transducer 21 and collimator 10 is shown. The coordinate system is partly nonstandard in that the positive Z-axis direction is opposite to that of the ordinary system of rectangular coordinates. With collimator 10 in its reference orientation ($\Phi=0°$), the field of view of transducer 21 is delineated by the lines 34 and 34', and when the collimator revolves through one half turn so that $\Phi=180°$ the field of view seen by the transducer 21 is that within the lines 35 and 35'. It should be understood, however, that the respective fields of view within these parallel dashed lines is cylindrical; that is, its cross section parallel to the plane of the transducer 21 is circular. Body 30 is shown within the lines 34 and 35 since it it the conical field within these lines that is always in view of transducer 21. Areas outside the conical field are less useful because discontinuous viewing of these areas would produce artifacts in the final image output. For purposes of illustration, three point sources of radiation S1, S2 and S3, are shown within body 30. Source S1 lies on a plane designated D1 which has a particular common coordinate Z1 in the rectangular coordinate system, and S1 has volume position coordinates (X1, Y1, Z1). Similarly, source S2 lies on a plane D2 and has coordinates (X2, Y2, Z2). Source S3 lies on plane D3 and has coordinates (X3, Y3, Z3).

The distance between the bottom surface of collimator 10 and the bottom surface of transducer 21 is designated as a fixed constant $c$. The distance between the bottom of collimator 10 and plane D1 is labeled $d1$ and the corresponding distances between the bottom of collimator 10 and planes D2 and D3 are designated $d2$ and $d3$, respectively.

Figure 2:
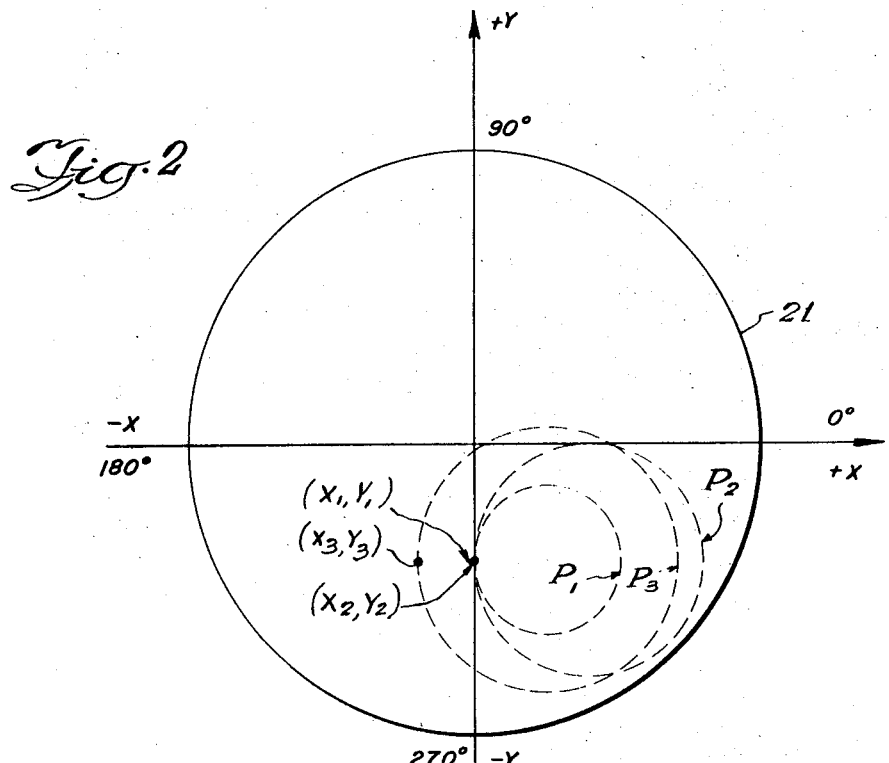
FIG. 2 is a top view of a portion of the apparatus shown in FIG. 1.

As shown, when collimator 10 is in a $\Phi=0$ position, radiation from source S1 passes along line 31 through a particularly channel in collimator 10 and strikes transducer 21 at a point shown in FIG. 2 having coordinates $(x1, y1)$. Radiation from source S2 passes along line 32 through this same collimating channel and strikes the same point on transducer 21. However radiation from source S3 passes along line 33 through a different collimating channel and strikes transducer 21 at a point designated in FIG. 2 as $(x3, y3)$.

If collimator 10 is rotated through one complete revolution, that is 360°, the path of the images generated by radiation from source S1 is a circle designated Pa on transducer 21. Similarly, the path of images of source S2 is designated P2, and the path of images of source S3 is designated P3. Path P1 is a circle with its center at coordinates (X1, Y1). Path P2 is a circle having its center at coordinates (X2, Y2). Path P3 is a circle concentric to path P1, having the same center coordinates. It is apparent that the radius of the circular image pattern on transducer 21 depends on the distance between the source generating the pattern and the transducer.

By performing an appropriate geometrical analysis, it can be shown that the radius R1 of circular path P1 is equal to the magnitude of coordinate Z1 multiplied by the magnitude of the tangent of the angle $\Phi$, or expressed in form of an equation.

$$R1=(Z1) \tan \Phi \quad \text{(E-1)}$$

Similarly, the equations for the magnitudes of the radii R2 and R3 of paths P2 and P3 are as follows:

$$R2=(Z2) \tan \Phi \quad \text{(E-2)}$$
$$R3=(Z3) \tan \Phi. \quad \text{(E-3)}$$

As a general expression, therefore, the radius of the circular image path of a particular point source of radiation on a plane having the coordinate $Zn$ can be given as follows:

$$Rn=(Zn) \tan \Phi. \quad \text{(E-4)}$$

From this it is evident that for a plane at a particular Z coordinate, the image of each point on that plane becomes a circle as collimator 10 rotates through a complete rotation from 0 to 360°. Of course, additional rotations of collimator 10 will produce a repeated circular path of images.

By examining the geometry inherent in the rotation of collimator 10, general equations for the paths P1, P2 and P3, and indeed any path of images from any plane through the body 30, can be written. It can be shown that the equations for path P1 can be written as follows:

$$x1=X1-(R1) \cos \theta$$
$$y1=Y1-(R1) \sin \theta. \quad \text{(E-5)}$$

Similarly, the equations for path P2 are $$x2=X2-(R2) \cos \theta$$
$$y2=Y2-(R2) \sin \theta \quad \text{E-6)}$$

and the equations for path P3 are $$x3=X3-(R2) \cos \theta$$
$$y3=Y3-(R2) \sin \theta. \quad \text{(E-7)}$$

From these equations, it can be seen that the general equations for the path of an image generated by radiation sources on a plane at depth $Zn$ are as follows:

$$xn=Xn-(Rn) \cos \theta$$
$$yn=Yn-(Rn) \sin \theta \quad \text{(E-8)}$$

Since the value of $Rn$ is a constant for a plane having a particular common $Zn$ value, it is also possible to write equations (E-8) as a function of $Zn$:

$$xn=Xn-(Zn) \tan \theta \cos \theta$$
$$yn=Yn-(Zn) \tan \theta \sin \theta. \quad \text{(E-9)}$$

It should be understood that the above analysis is based on an idealized mathematical model of the physical system that would be present in any actual use of the apparatus shown. For example, a point source of radiation, even if a physical reality, would produce on transducer 21 not an actual circular image path but a thin ring as collimator 10 rotates. Moreover, in a typical usage of the apparatus, radiation would be distributed throughout total volume of the body 30 under investigation so that no discrete image paths would be discernable. However, from the above discussion, it can be seen that, by knowing the point source response function of the combination of rotating collimator 10 and transducer 21, it is possible to discern that the images on transducer 21 generated by elemental volumes of radionuclides distributed across particular Z-planes throughout the body 30 involved different patterns of motion related to the value of the Z coordinate of the plane. From this it can be shown that it is possible to operate on the signals produced by the radiation detector which includes transducer 21 to produce displayed images of body 30 that are essentially focused on different planes at selected depths. Thus, looking at the general equations (E-8) for the paths of images from sources on plane $Dn$, it can be seen how the output of the radiation detector can be manipulated to produce an in-focus image of radiation on that plane. The radiation detector which incorporates transducer 21 must, of course, be of the type which produces output signals representing the position coordinates of the point at which each individual incident quantum of radiation strikes transducer 21.

Looking again at source S1 on plane D1, the position coordinates $(x1, y1)$ of a scintillation produced in a sodium iodide crystal serving as transducer 21 would be transformed into electrical signals representing the coordinates $(x1, y1)$. Solving the equations (E-5) for the path P1 in terms of constants $X1$ and $Y1$ gives us the following equations:

$$X1=x1+(R1) \cos \theta$$
$$Y1=y1+(R1) \sin \theta. \quad \text{(E-10)}$$

From these equations we can see that the electrical signals representing the values of $x1$ and $y1$ can be altered by addition of appropriate signals representing $(R1) \cos \theta$ and $(R1) \sin \theta$, respectively, to produce electrical signals representing $X1$ and $Y1$. In the general sense, it can be seen that the value of $R1$ is the same for all $X$ and $Y$ coordinates on plane D1. Of course, the values for $\cos \theta$ and $\sin \theta$ are dependent not upon coordinates $X$ and $Y$ but upon the polar coordinate orientation of the collimator 10. Therefore, the values of the correction signals for all points on plane D1 are the same, that is, they are independent of the particular value of the coordinates $(X, Y)$.

Looking again at source S1 and path P1 in FIGS. 1 and 2, it is apparent that by correcting the output signals representing the coordinates $(x1, y1)$ in the manner suggested above, the displayed output of the radiation detector would be changed from a circular path P1 to a single point at the coordinates $(X1, Y1)$. This is shown in FIG. 4 and will be more clearly understood from a discussion of the system shown in FIG. 3 for performing the output signal corrections. As shown in FIG. 4, the image output, contributed by source S2, after correction for source S1, is a circle, as is the final image output from source S3. However, the output image contributed by source S2 is a circle which has a radius equal to the difference between the values of $R2$ and $R1$. Similarly, the radius of the output image contributed by source S3 is a circle having a radius equal to the difference between the value of $R$ and the value of $R1$. If we extrapolate the picture shown in FIG. 4 to a situation in which body 30 contains a volume distribution of radionuclides, it will be apparent that only the radioactivity on plane D1 will be in-focus, whereas the radioactivity on planes D2 and D3 and all other Z-planes intersecting body 30 will be blurred. The amount of blurring will depend upon the separation distance of the out-of-focus plane from the in-focus plane.

FIG. 5 illustrates the picture that would be obtained when the output signals from the radiation detector are corrected to provide for in-focus imaging of the radionuclides on plane D2. Thus, in FIG. 5 the output contributed by source S2 becomes a point at the precise coordinates ($X2$, $Y2$), whereas the final images contributed by sources S1 and S3 are circles having radii equal to the difference between $R2$ and $R1$, and $R2$ and $R3$ respectively. Again extrapolating to a case where a complete volume distribution of radioactivity exists in body 30, only the radioactivity on plane D2 would be in-focus and the radioactivity on all other planes would be relatively out-of-focus.

A similar description can be given of FIG. 6 which shows the output images from sources S1, S2 and S3 when the outputs from the radiation detector are corrected in terms of the appropriate correction signals for plane D3. Again, source S3 is now in-focus whereas sources S1 and S2 are out-of-focus.

From the various displays shown in FIGS. 4, 5 and 6, it can be seen that multiple tomographic output images can be produced by selecting various correction signal values either by displaying the resulting images sequentially on the same output device or simultaneously on separate output devices. In FIG. 3 a block diagram of a typical system for producing the tomographic images is shown. A rotatable collimator 10 is mounted beneath a detector head 20 and driven by a collimator drive 30. Detector head 20 is coupled to a system of detector electronics 40 which produces position coordinate signals $x$, $y$ and may also produce a trigger signal T. Detector head 20 and detector electronics 40 are preferably of the Anger scintillation camera type. The coupling between collimator drive 30 and collimator 10 is mechanical, whereas the coupling between detector head 20 and detector electronics 40 is electrical.

Collimator 10 is also connected to a pair of function generators 50 and 51 which translate the position $\theta$ of the collimator into appropriate cos $\theta$ and sin $\theta$ signals. Function generators 50 and 51 are coupled to attenuators 60 and 61 which are in turn controlled in their attenuation value $Rn$ by variable attenuator control 90. The output of the attenuator 60 thus becomes $(Rn)$ cos $\theta$ and the output of attenuator 61 becomes $(Rn)$ sin $\theta$.

The $x$ output of detector electronics 40 and the $(Rn)$ cos $\theta$ output of attenuator 61 are coupled to a summing circuit 70. Similarly, the $y$ output of detector electronics 40 and the $(Rn)$ sin $\theta$ output of the attenuator 61 are coupled to summing circuit 71. The output of summing circuit 70 is a corrected position coordinate signal $X$, and the output of summing circuit 71 is a corrected position coordinate signal $Y$. The $X$ output of summing circuit 70 is coupled to the horizontal input terminal H of an oscilloscope 80. The $Y$ output of summing circuit 71 is coupled to a vertical input terminal V of oscilloscope 80. The trigger output T of detector electronics 40 is coupled to the triggering input T of oscilloscope 80.

The operation of the circuitry of FIG. 3 will now be described. Collimator drive 30 causes collimator 10 to rotate in a preselected direction at a substantially constant angular velocity. Function generators 50 and 51 track the rotation of collimator 10 and produce variable sine and cosine signals depending on the value of $\theta$ as the collimator rotates. Variable attenuator control 90 is set for a particular value of $Rn$ which in turn selects the plane beneath collimator 10 which will be displayed in-focus on the face 81 of oscilloscope 80. Attenuators 60 and 61 produce at their respective outputs the final correction signals $(Rn)$ cos $\theta$ and $(Rn)$ sin $\theta$. Detector head 20 together with detector electronics 40 provides position coordinate signals $x$, $y$ for each scintillation produced by a quantum of radiation interacting with the transducer in detector head 20. A triggering signal would be produced at output T if detector electronics 40 if the scintillation represents incoming radiation of the described energy and triggers oscilloscope 80 to produce a properly positioned dot on faceplate 81 in accordance with the values of the signals $X$, $Y$. The signals $X$ and $Y$ from detector electronics 40 and the associated correction signals from attenuators 60 and 61.

The overall output image on the faceplate 81 of oscilloscope 80 will be in-focus only for radionuclides on the plane selected by setting the value of variable attenuator control 90. Thus, only when variable attenuator control 90 is set to a value $Rn$ equal to $R1$ will the radionuclides on plane D1 be shown in-focus on face panel 81. Images generated by radionuclides on other planes will be relatively out-of-focus because the scintillations they produce in detector head 20 will not result in properly corrected coordinate signals $X$, $Y$.

From the system shown in FIG. 3 and described above, it should be apparent that a plurality of tomographic output images would be obtained by adding additional units of output circuitry for separately operating on the $x$, $y$ cos $\theta$, sin $\theta$ output signals. In other words, images essentially focused at various depths could be produced at the same time by setting the valves of $Rn$ differently on different sets of output circuitry. Of course it would always be possible to form sequential images by changing the value of $Rn$ from time-to-time using only one set of output circuitry.

In addition, it should be recognized that the signal $x$, $y$, cos $\theta$, sin $\theta$ could be recorded during the overall time of exposure of an object to the device and later processed into single or multiple tomographic images. Recording the signals would ensure that the desired tomographic images could always be obtained and would permit the sequential examination of activity in all planes within the object by replaying the recorded data through the proper output circuitry.

Other types of moving collimator systems might also be devised. The above description is merely given by way of example, and it should be understood that numerous modifications could be made by those skilled in the art without departing from the scope of this invention as claimed in the following claims.

I claim:

1. In a radiation camera for imaging the volume distribution of radionuclides throughout an object under investigation, in combination:

a radiation detector, including a radiation sensitive transducer, of the type producing an output representing plane position coordinates of a quantum of radiation interacting with said transducer, said detector being adapted to be held stationary with respect to said object;

means interposed between said transducer and said object operative to produce predetermined patterned movement of each image generated on said transducer by quanta of radiation emanating from radionuclides in each elemental volume of said object, said predetermined patterned movement differing in accordance with the volume position coordinates of each said elemental volume such that the output for said radiation detector may be translated into useful information concerning the distribution of radionuclides across a plane through said object at any selected distance from said transducer.

2. The combination as claimed in claim 1, further comprising means receiving said output of said radiation detector operative to translate said output in accordance with said predetermined patterned movement into a useful image presentation of the distribution of radionuclides across a plane through said object at a preselected distance from said transducer.

3. The combination as claimed in claim 1, wherein said radiation sensitive transducer has a substantially planar detecting area, and said means interposed between said radiation sensitive transducer and said object includes radiation shielding means defining a substantially uniform radiation acceptance direction for each of a multiplicity of elemental areas of said transducer, and driving means operatively associated with said radiation shielding means for repetitively changing said radiation acceptance direction.

4. The combination as claimed in claim 3, wherein said radiation shielding means comprises a collimator of substantially radiation-impervious material defining an array of mutually spaced apertures, each of said apertures having a common nonnormal axial orientation with respect to said radiation sensitive transducer; said collimator being rotatably mounted adjacent said detection area of said radiation sensitive transducer; said driving means comprising means operative to rotate said collimator; said predetermined patterned movement of each image thereby being substantially circular, the center of each said circular movement corresponding to the plane position coordinates of its associated elemental volume and the radius of said circular movement being a predetermined function of the separation distance between said associated elemental volume and said transducer and said axial orientation of said apertures.

5. The combination as claimed in claim 4, further comprising translating means receiving said output of said radiation detector operative to sense continuously the position of said collimator and to translate said output in accordance with a preselected value of said predetermined function and said sensed position of said collimator into a focused image presentation of the distribution of radionuclides across an associated plane through said object.

6. The combination as claimed in claim 5, wherein said output from said radiation detector comprises a first pair of signals representing in sign and magnitude the $x$ and $y$ coordinates of interaction of a quantum of radiation with said transducer; said translating means including: function generating means operatively associated with said collimator to produce a second pair of signals representing in sign and magnitude the cosine and sine functions of the angular position $\theta$ of said collimator with respect to a polar coordinate system having its pole on the axis of rotation of said collimator and its initial line ($\theta=0$) in the $+x$ direction from said pole, attenuating means for uniformly attenuating each of said second pair of signals in accordance with a preselected attenuation value representing said preselected value of said predetermined function, and arithmetic means for arithmetically combining said first pair of signals and said attenuated second pair of signals to produce a third pair of signals representing in sign and magnitude corrected $X$ and $Y$ coordinates of interaction of said quantum of said radiation with respect to said rectangular coordinate system, such that each detected quantum of radiation originating from radionuclides in an elemental volume on said associated plane will produce said third pair of signals representing substantially the $x$ and $y$ coordinates of said elemental volume independent of the orientation of said collimator, whereas each detected quantum of radiation originating from radionuclides in an elemental volume not on said associated plane will produce said third pair of signals representing $x$ and $y$ coordinates of a particular point on a circular path depending upon the orientation of said collimator.

7. The combination as claimed in claim 6, wherein said translating means further includes display means receiving said third pair of signals operative to produce an image comprising a plurality of elemental indicia each corresponding to an individual quantum of radiation impinging upon said transducer and being position ed in an associated coordinate system in accordance with said corrected $X$ and $Y$ coordinates associated therewith, said image being in-focus for said associated plane and out-of-focus for all other planes.

8. Apparatus for imaging an object having a three-dimensional distribution of radionuclides therethroughout, comprising:
a radiation detector including a radiation sensitive transducer having a two-dimensional radiation detecting capability and output means associated with said transducer operative to produce a first pair of signals $x$ and $y$ representing the plane position coordinates of a quantum of radiation interacting with said transducer;
a multichannel radiation collimator rotatably mounted in a position adjacent said transducer, the axis of each channel of said collimator having substantially the same nonnormal angular orientation with respect to said transducer;
support means for supporting said radiation detector in a selectable, stationary position with respect to said object;
drive means for rotating said collimator to vary continuously the viewing direction of said transducer with respect to said object; and
image display means receiving said first pair of signals operative in accordance with said rotation of said collimator to produce a displayed image of said object comprising an in-focus image of the distribution of radionuclides across a selected plane through said object at a selected distance from said transducer and blurred images of the distribution of radionuclides not on said plane.

9. Apparatus as claimed in claim 8, wherein said image display means includes:
first circuit means operatively associated with said collimator for generating a second pair of signals representing coordinate correction functions $(Dn) \tan \Phi \cos \theta$ and $(Dn) \tan \Phi \sin \theta$ where
Dn is the said selected distance,
$\Phi$ is the constant angle between the axes of said collimator channels and a line normal to said transducer, and
$\theta$ is the varying rotational coordinate of said collimator;
second circuit means for arithmetically combining said first and second pairs of signals to produce a third pair of signals representing corrected position coordinates associated with each quantum of radiation interacting with said transducer; and
display means receiving said third pair of signals operative to produce an image comprising a plurality of elemental indicia each corresponding to an individual quantum of radiation interacting with said transducer and being positioned in accordance with said associated corrected position coordinates.

10. Apparatus for tomographically imaging a three-dimensional distribution of radionuclides throughout an object under investigation, comprising:
an Anger-type radiation detector including a thin cylindrical scintillation crystal and means for producing two output signals representing position coordinates of interaction of a quantum of radiation with said crystal;
support means for supporting said detector in a stationary position with respect to said object;
means including a radiation collimator interposed between said crystal and said object for producing predetermined patterned changes in the direction of radiation acceptance between said object and said crystal; and
tomographic display means for translating said output signals of said detector in accordance with said patterned changes into at least one tomographic image of the distribution of radionuclides across a plane through said object parallel to said crystal and at a selectable distance from said crystal.

11. In a radiation camera for imaging the volume distribution of radionuclides throughout an object under investigation, in combination:
a radiation detector, including a radiation sensitive transducer, of the type producing an output representing plane position coordinates of a quantum of radiation interacting with said transducer; and
a multichannel radiation collimator rotatably mounted on said detector adjacent said transducer, the axis of each channel of said collimator having generally the same nonnormal angular orientation with respect to said transducer whereby the viewing direction for said transducer defined by said collimator may be varied in a regular manner to produce outputs from said detector which may be translated into in-focus images of radionuclide distributions across individual selected planes through said object.

12. In apparatus for producing a tomographic image of an object containing a three-dimensional distribution of radionuclides, the combination comprising:
  a radiation detector including sensitive transducer having a two-dimensional radiation detecting capability and output means for producing a pair of signals representing plane position coordinates of interaction of a quantum of radiation with said transducer; and
  a collimator system comprising a multichannel radiation collimator rotatably mounted adjacent said transducer and a collimator drive for rotating said collimator, the axis of each channel of said collimator having substantially the same nonnormal angular orientation with respect to said transducer; whereby said output of said radiation detector may be translated into selective tomographic images of the distribution of radionuclides at different depths in said object when viewed by said detector.

13. In combination:
  an Anger-type radiation detector, including a scintillation crystal;
  a multichannel radiation collimator rotatably mounted on said detector, the axis of each channel of said collimator having the same nonnormal angular orientation with respect to said crystal; and
  driving means for rotating said collimator generally to produce on said crystal apparent circular patterns of images of radionuclides distributed throughout a three-dimensional object viewed by said detector which may be translated at the output of said detector into tomographic images of radionuclide distributions on planes at selected depths in said object.

14. A tomographic gamma ray imaging device comprising, in combination:
  an Anger-type radiation detector for producing position coordinate signals corresponding to the location of a scintillation in the crystal therein;
  a multichannel radiation collimator rotatably mounted on said detector, the axis of each channel of said collimator having the same nonnormal angular orientation with respect to said crystal;
  driving means for rotating said collimator;
  translating means sensing the rotational orientation of said collimator and translating said position coordinate signals into tomographic position coordinate signals in accordance with said sensed collimator orientation; and
  display means for displaying a visible elemental indicia in accordance with said tomographic position coordinate signals; whereby a timewise integration of said indicia will produce a tomographic image of an object viewed by said device.

UNITED STATES PATENT OFFICE
CERTIFICATE OF CORRECTION

Patent No. 3,612,865    Dated October 12, 1971

Inventor(s) William G. Walker

It is certified that error appears in the above-identified patent and that said Letters Patent are hereby corrected as shown below:

Cancel columns 1 thru 12 and substitute the attached columns 1 thru 12.

Signed and sealed this 8th day of May 1973.

(SEAL)
Attest:

EDWARD M. FLETCHER, JR.            ROBERT GOTTSCHALK
Attesting Officer                  Commissioner of Patents